(12) United States Patent
Weiss et al.

(10) Patent No.: US 8,162,343 B2
(45) Date of Patent: Apr. 24, 2012

(54) BICYCLE SUSPENSION SYSTEM

(75) Inventors: Martin Weiss, Schweinfurt (DE); Scott McLaughlin, Chicago, IL (US); Paul Feuerstein, Brookfield, IL (US); Matthew Morris, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 13/164,977

(22) Filed: Jun. 21, 2011

(65) Prior Publication Data

US 2011/0247448 A1 Oct. 13, 2011

Related U.S. Application Data

(63) Continuation of application No. 12/205,318, filed on Sep. 5, 2008, now Pat. No. 7,988,173.

(51) Int. Cl.
*B62K 23/06* (2006.01)

(52) U.S. Cl. ....... 280/276; 280/279; 280/280; 74/502.2; 248/230.4; 248/229.13; 248/230.1; 248/316.1; 248/316.5

(58) Field of Classification Search ................. 74/502.2; 248/230.4, 229.13, 230.1, 316.1, 316.5
See application file for complete search history.

(56) References Cited

U.S. PATENT DOCUMENTS

| 7,594,741 B2* | 9/2009 | Okajima et al. | 362/473 |
| 2002/0125388 A1* | 9/2002 | Eslick | 248/230.4 |
| 2003/0132335 A1* | 7/2003 | Schmidt | 242/419.4 |
| 2005/0079756 A1* | 4/2005 | Kawai et al. | 439/460 |
| 2006/0004392 A1* | 1/2006 | Amarant | 606/153 |
| 2006/0285343 A1* | 12/2006 | Okajima et al. | 362/473 |

FOREIGN PATENT DOCUMENTS

WO WO2009/013475 11/2009

* cited by examiner

*Primary Examiner* — Paul N Dickson
*Assistant Examiner* — Marlon Arce
(74) *Attorney, Agent, or Firm* — Milan Milosevic; Lisa Serdynski; Steven Courtright (57) ABSTRACT

A mounting device is shown for mounting components to a bicycle handlebar having a handlebar axis. The mounting device includes a mounting bracket mountable to the handlebar about the handlebar axis. The mounting bracket includes a first clamp portion and a second clamp portion hingedly connected to the first clamp portion to interiorly receive the handlebar. An interior channel is defined by spaced sidewalls and formed in a portion of the circumferential length of one of the first and second clamp portions, and a hole is formed through the clamp portion and opens to the channel.

11 Claims, 8 Drawing Sheets

BICYCLE SUSPENSION SYSTEM

This is a continuation of U.S. patent application Ser. No. 12/205,318; filed on Sep. 5, 2008.

BACKGROUND OF THE INVENTION

The present invention relates to bicycle suspension systems and more particularly to a bicycle suspension system including a hydraulic control assembly to operate a bicycle suspension between first and second suspension settings.

SUMMARY OF THE INVENTION

The present invention provides a mounting device for mounting components to a bicycle handlebar having a handlebar axis. The mounting device includes a mounting bracket mountable to the handlebar about the handlebar axis. The mounting bracket includes a first clamp portion and a second clamp portion hingedly connected to the first clamp portion to interiorly receive the handlebar. An interior channel is defined by spaced sidewalls and formed in a portion of the circumferential length of one of the first and second clamp portions, and a hole is formed through the clamp portion and opens to the channel.

These and other features of the present invention will be more fully understood from the following description of one or more embodiments of the invention, taken together with the accompanying drawings.

DETAILED DESCRIPTION

FIGS. 1-8 illustrate a bicycle suspension system 10 according to one embodiment of the present invention. The bicycle suspension system 10 generally includes a bicycle suspension 12 and a hydraulic control assembly 14 for operating the bicycle suspension 12 between first and second suspension settings. Looking to FIGS. 1 and 2, the bicycle suspension 12 is a bicycle front suspension fork having a crown 16 that is connected to a steerer tube 18, a first leg 20 that may contain a biasing mechanism or spring assembly, and a second leg 22 that contains a damping assembly 24. Each of the legs 20, 22 includes an inner tube 26 and an outer tube 28 slidably displaceable relative to each other. The inner and outer tubes 26, 28 are connected at their upper ends 30 to the crown 16 and to a wheel axle (not shown) at lower ends 32, respectively. It is to be understood that although the present invention is described with respect to a front suspension fork, the bicycle suspension may be also be embodied in a rear shock, a seat post, or in similar applications on a bicycle frame.

Figure 1:
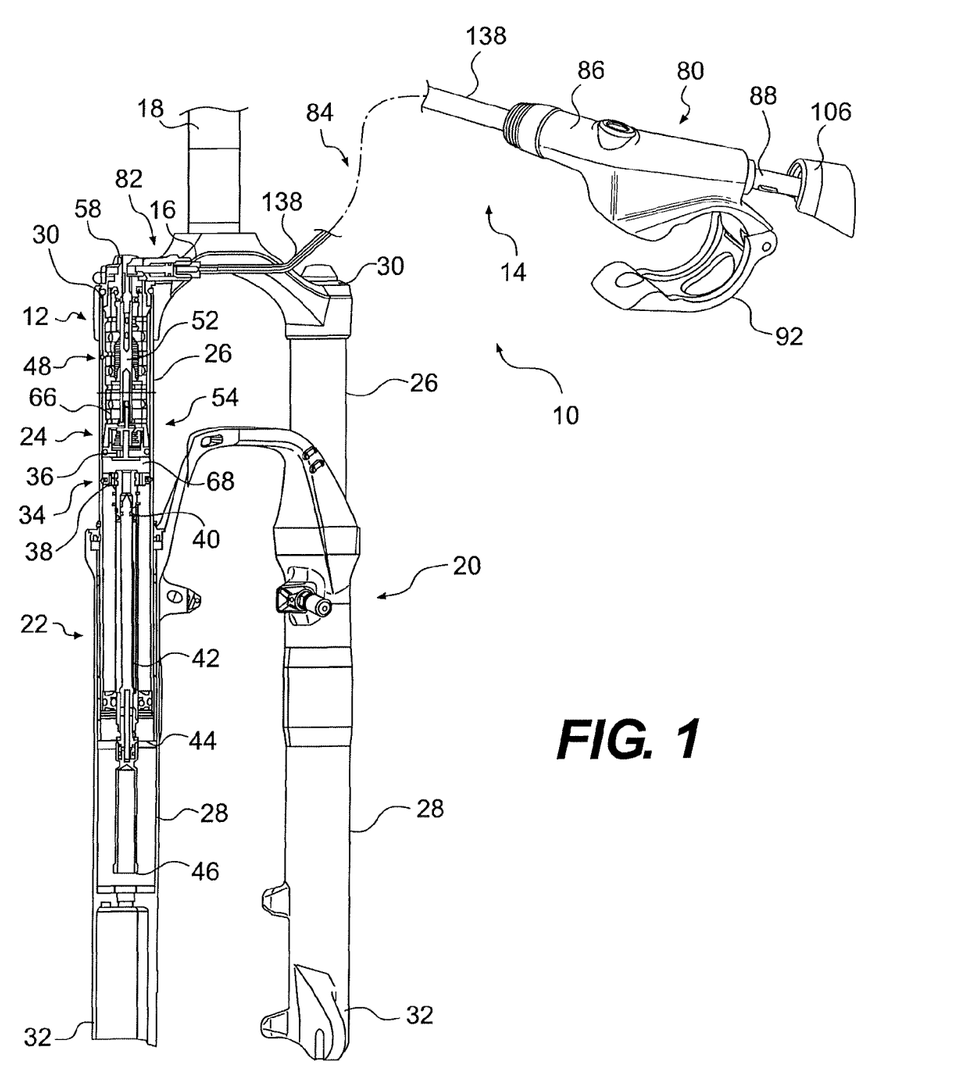
FIG. 1 is a partial cross-sectional perspective view of a bicycle suspension system according to one embodiment of the present invention.
Figure 2:
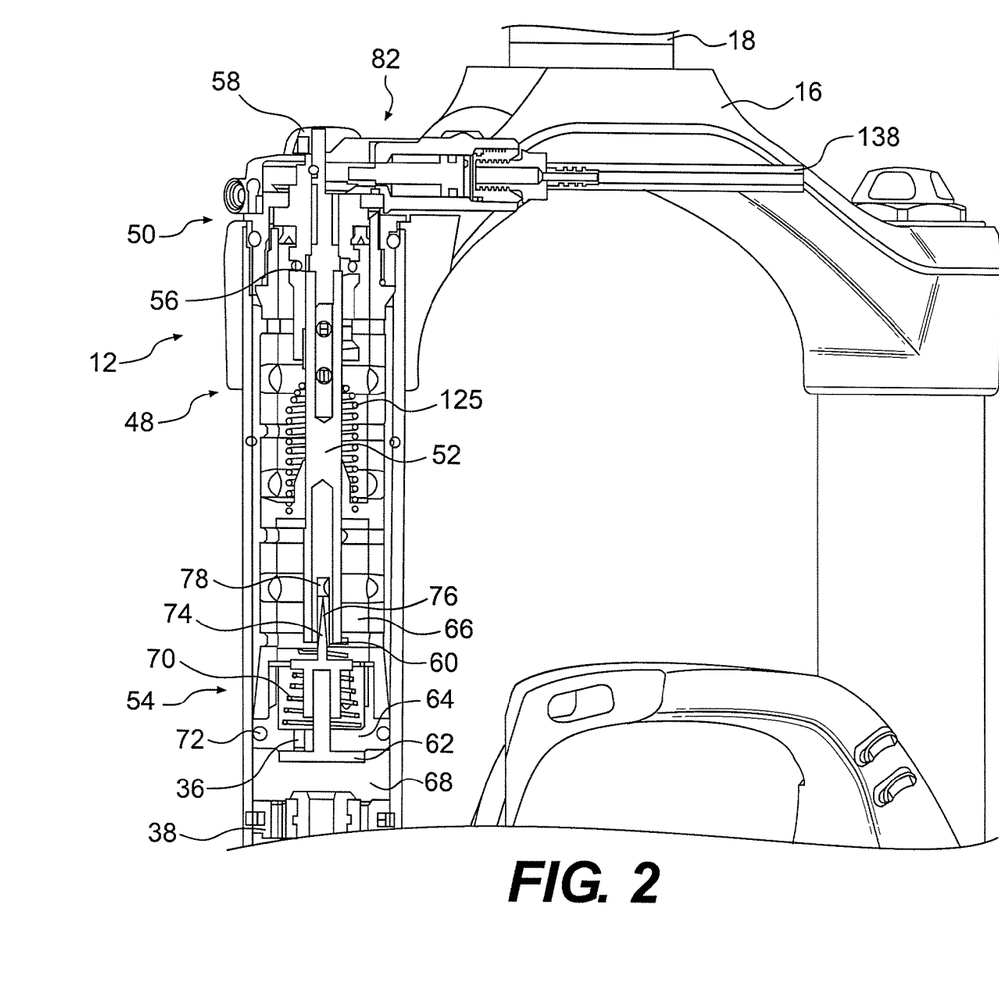
FIG. 2 is an enlarged portion of the bicycle suspension system of FIG. 1.

The damping assembly 24 includes a compression piston assembly 34 that slides within the inner tube 26 during compression and rebound of the suspension, and an orifice 36 through which fluid restrictively passes to dampen fork displacement in response to an applied load. The compression piston assembly 34 includes a piston 38 that is attached to a first end 40 of a piston rod 42. The piston rod 42 extends through an end 44 of the inner tube 26 and has a second end 46 that is nonrotatably mounted to the outer tube 28.

The bicycle suspension 12 includes a lockout mechanism 48 for adjusting the suspension 12 between being a substantially rigid setting, the first suspension setting, and a substantially compressible setting, the second suspension setting. Alternatively, the suspension 12 may be adjusted between two or more substantially compressible settings. The lockout mechanism 48 includes a valve actuating assembly 50 that has a driver 52 that is rotated to open and close a valve mechanism 54. The driver 52 has a first end 56 rotatably connected to the hydraulic control assembly 14 and a manual knob 58, and a second end 60 rotatably connected to the valve mechanism 54.

The valve mechanism 54 includes a valve 62 and a valve seat 64 disposed in the inner tube 26, the valve mechanism 54 dividing the inner tube 26 into first and second fluid chambers 66, 68. The orifice 36 extends through the valve seat 64 to allow fluid flow between the chambers 66, 68. The valve 62 is operable between an open position, which opens the orifice 36 to permit fluid flow between the chambers 66, 68, and a closed position, which closes the orifice 36 to prevent fluid flow between the chambers 66, 68. The valve 62 is biased toward the closed position by a valve spring 70. An O-ring 72 about the valve seat 64 provides a seal between the first and second fluid chambers 66, 68. The valve 62 includes a valve stem 74 that extends through the valve seat 64 into the first fluid chamber 66. An end 76 of the valve stem 74 is received in a slot 78 of the driver 52. Upon rotation of the driver 52, the valve 62 rotates to open or close the orifice 36 depending on the direction of rotation.

The hydraulic control assembly 14 generally includes a fluid pump 80, a fluid responder 82 and a fluid path 84 linking the fluid pump and the fluid responder. Looking to FIGS. 3-5, the fluid pump 80 includes a first housing 86, a first piston 88, and a first actuator 90. The first housing 86 is mountable to a bicycle handlebar 91 by a clamp 92. Although the clamp 92 is shown as being integral with the first housing 86, alternatively, it may be discrete from the first housing 86. The first housing 86 includes a first fluid cavity 94 for receiving the first piston 88 slidably disposed therein and a first fill hole 96 for inserting fluid into the first fluid cavity 94. A sealing screw 98 is threaded into the first fill hole 96. The clamp 92 includes a portion with an interior channel C defined by spaced sidewalls $S_1$, $S_2$, and formed in a portion of the circumferential length of the clamp portion, and a hole H, is formed through the clamp portion and opens to the channel. The hole H may have a major diameter $M_1$ and a minor diameter $M_2$.

Figure 3:
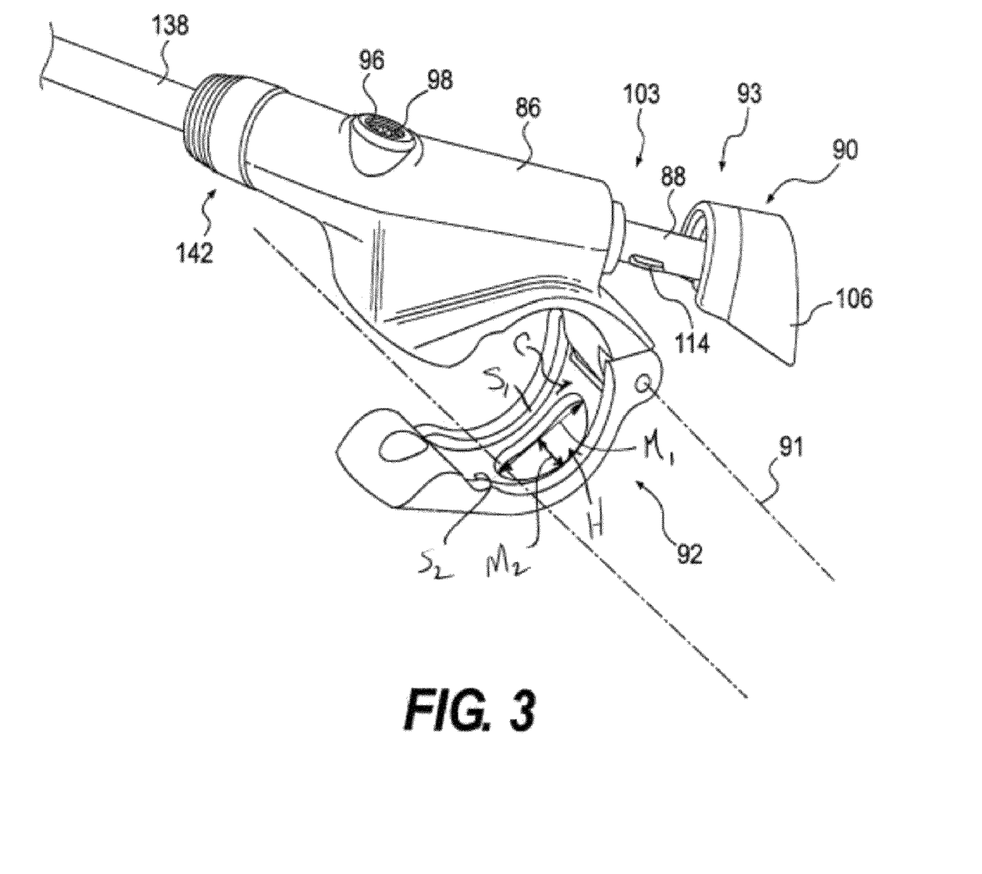
FIG. 3 is a perspective view of a fluid pump of the bicycle suspension system of FIG. 1.
Figure 4:
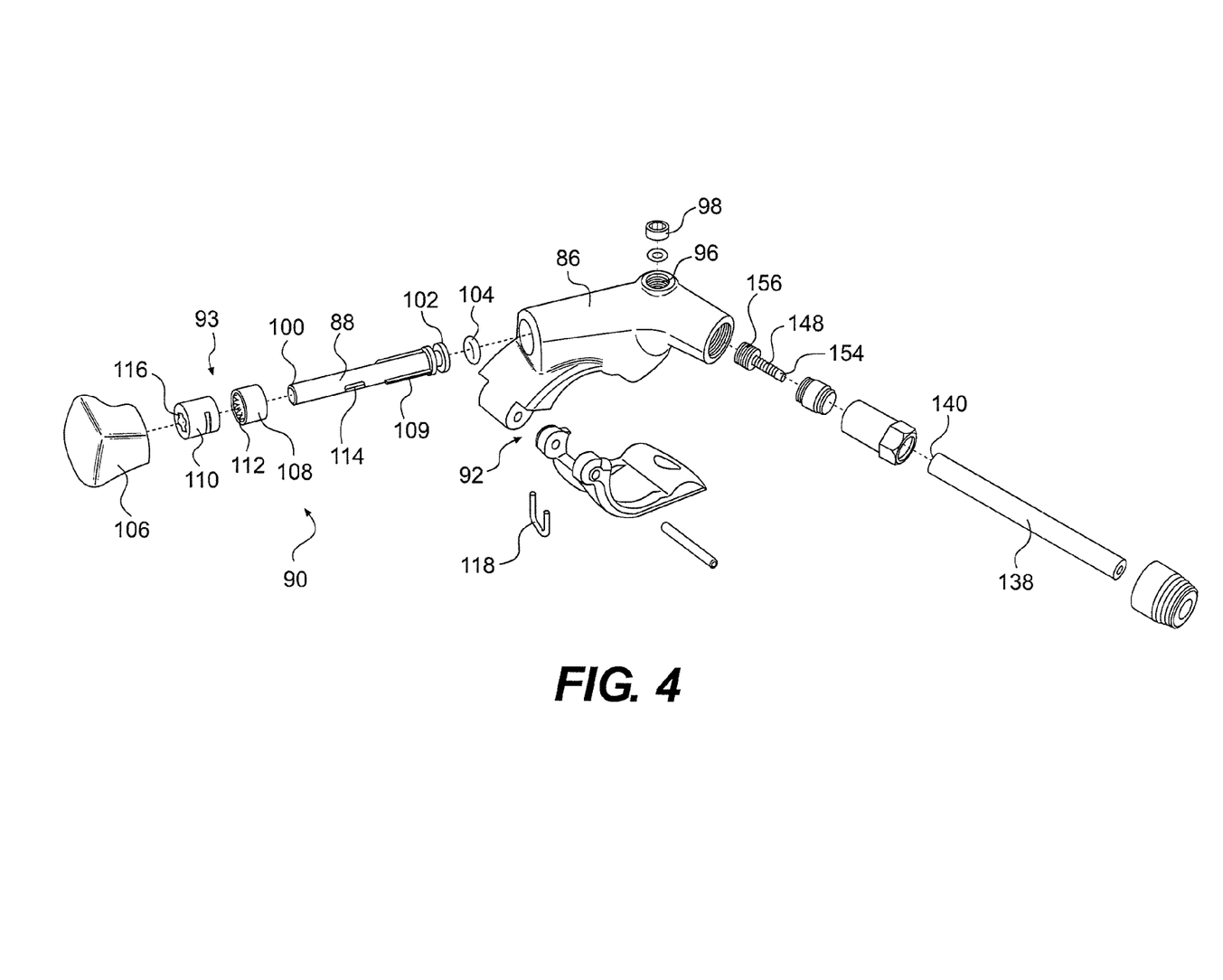
FIG. 4 is an exploded view of the fluid pump of FIG. 3.
Figure 5:
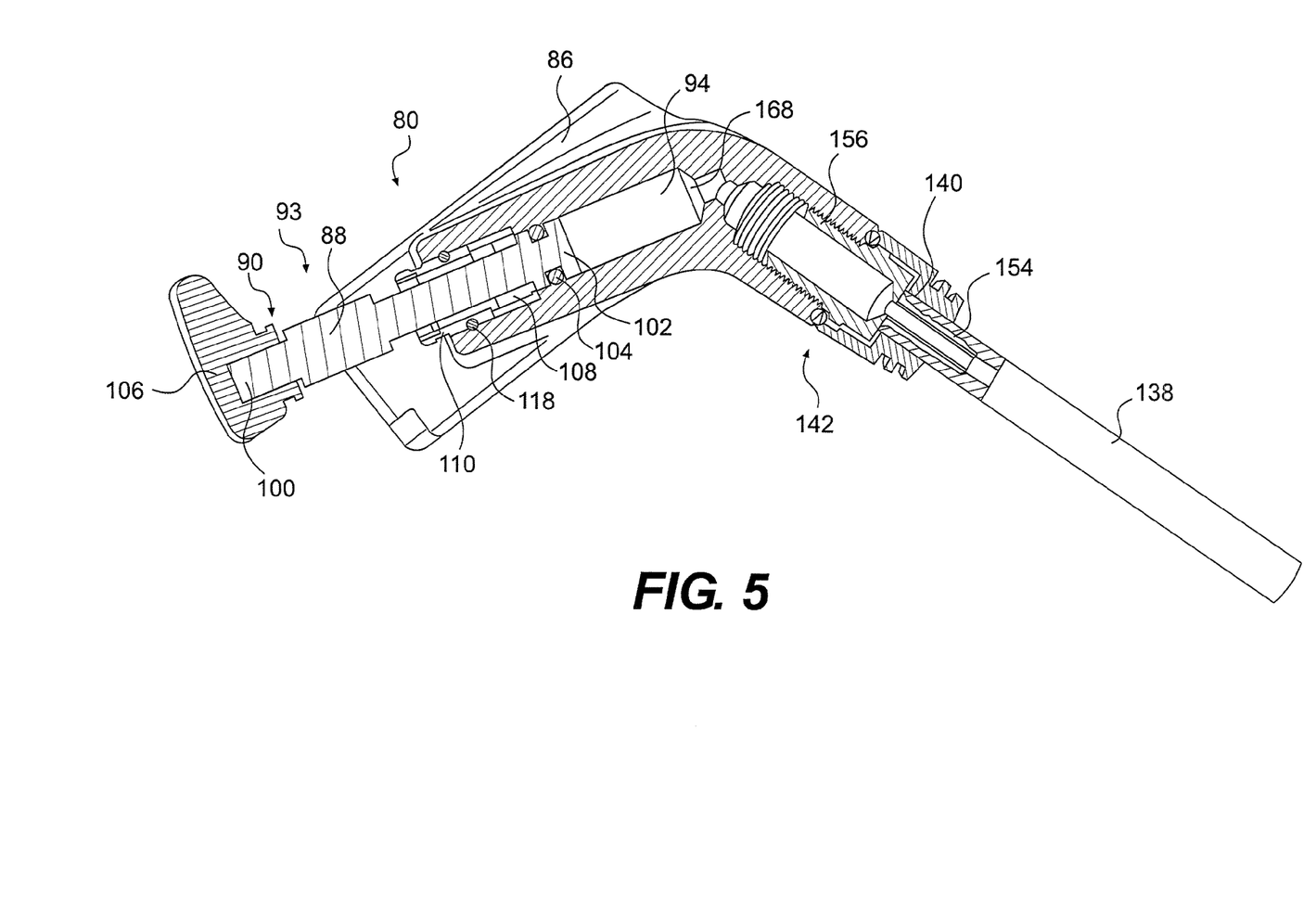
FIG. 5 is a cross-sectional view of the fluid pump of FIGS. 3 and 4.

The first piston 88 includes first and second ends 100, 102. The first piston 88 is slidably displaceable between a first position and a second position. The first position may correspond to a substantially compressible suspension setting and the second position may correspond to a substantially rigid suspension setting. The first end 100 of the first piston 88 is connected to the first actuator 90 and the second end 102 includes an O-ring 104 to sealably connect the second end 102 of the piston 88 to the first housing 86.

The first actuator 90 includes a push-push toggle mechanism 93 including a push-button 106, a locking element 108 and a retaining element 110. The push-button 106 is connected to the first end 100 of the first piston 88. The locking element 108 is configured to receive the first piston 88 and includes a plurality of ridges 112 on an inner surface of the locking element 108 for releasably engaging with a plurality of projections 114 on an outer surface of the first piston 88. As the first piston 88 is displaced, by pushing the push-button 106, the projections 114 of the first piston releasably engage the ridges 112 of the locking element 108, rotating the locking element 108 into a locked position against the stop projections 109 on the outer surface of the first piston 88. The retaining element 108 is also configured to receive the first piston 88 for maintaining the locking element 108 in an axially fixed position. The retaining element 110 includes a plurality of anti-rotation features 116 for matingly engaging with the projections 114 on the first piston 88 to prevent rotation of the retaining element 110. A U-shaped pin 118 secures the retaining element 110 to the first housing 86.

Figure 6:
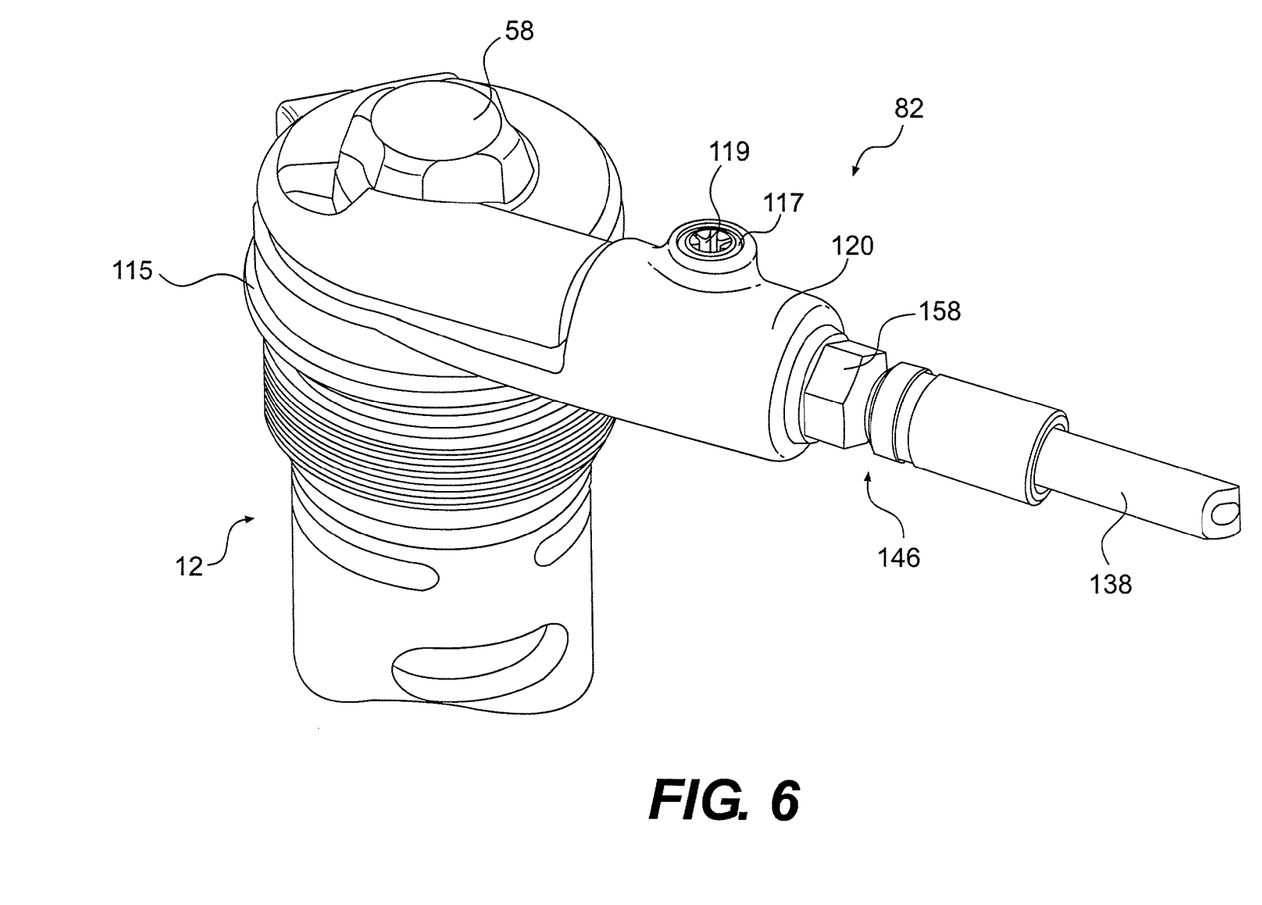
FIG. 6 is a perspective view of a fluid responder of the bicycle suspension system of FIG. 1.
Figure 7:
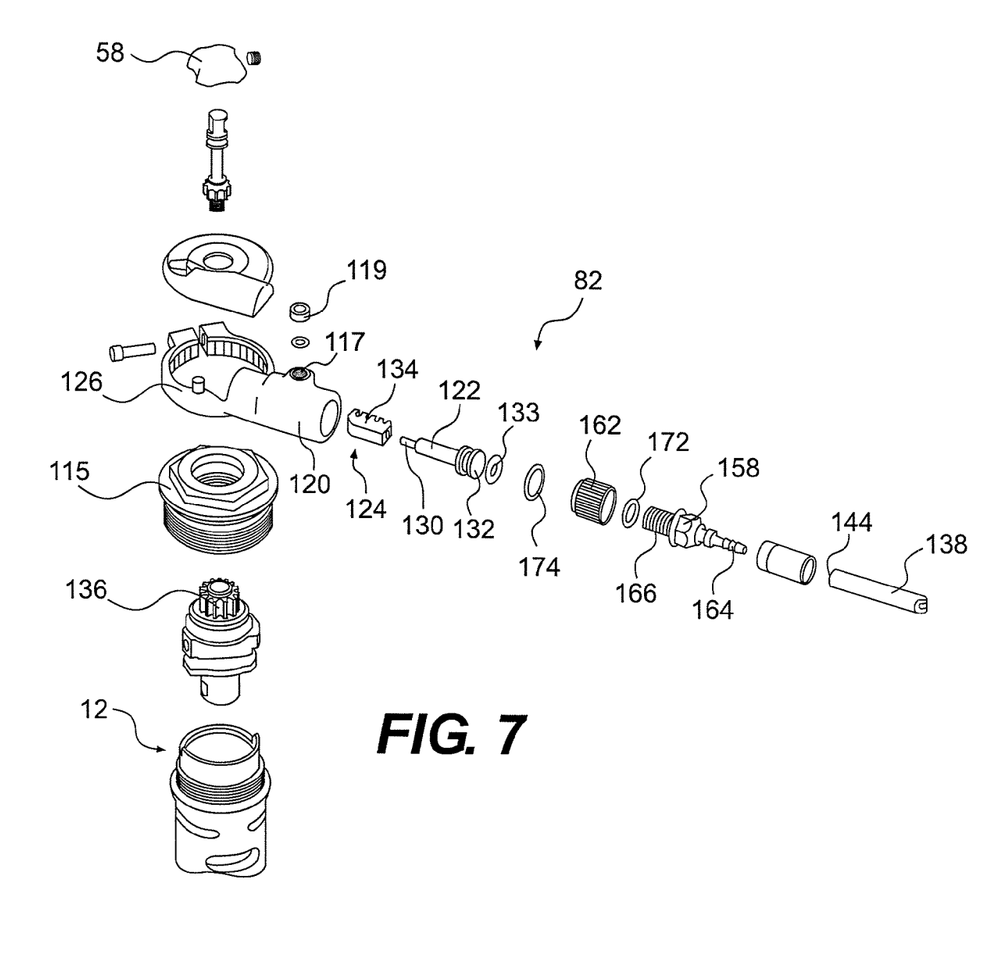
FIG. 7 is an exploded view of the fluid responder of FIG. 6.
Figure 8:
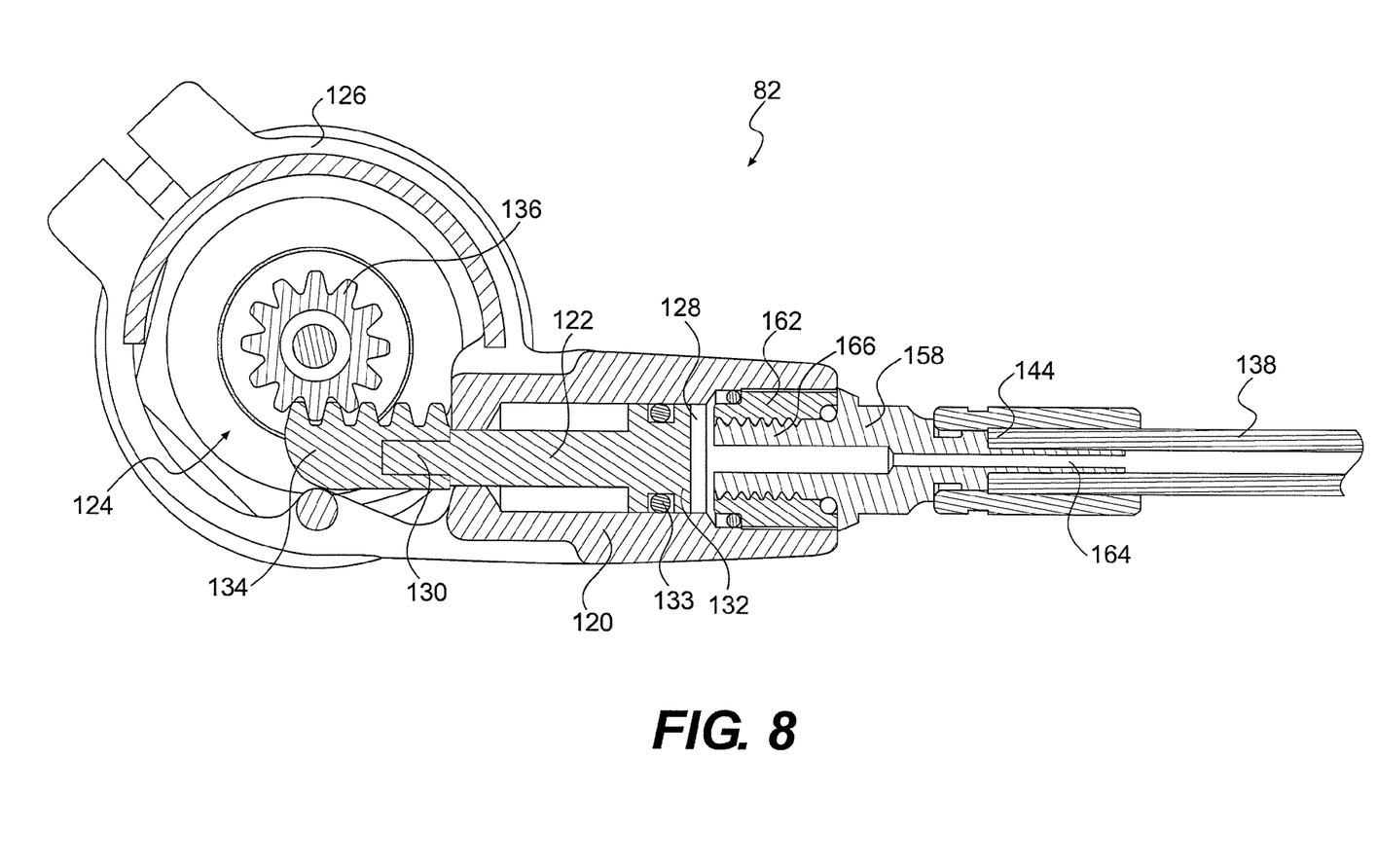
FIG. 8 is a cross-sectional view of the fluid responder of FIGS. 6 and 7.

Looking to FIGS. 6-8, the fluid responder 82 includes a second housing 120, a second piston 122 and a second actuator 124. The second housing 120 is mountable to a cap 115 of the bicycle suspension 12 by a clamp 126. The second housing 120 includes a second fluid cavity 128 for slidably receiving the second piston 122 therein and a second fill hole 117 for inserting fluid into the fluid cavity 128. A sealing screw 119 is threaded into the second fill hole 117. The second piston 122 includes first and second ends 130, 132. The second piston 122 is slidably displaceable between a first position and a second position. The first position corresponds to the substantially compressible suspension setting and the second position corresponds to the substantially rigid suspension setting. The first end 130 of the second piston 122 is connected to the second actuator 124 and the second end 132 includes an O-ring 133 to sealably connect the second end 132 of the second piston 122 to the second housing 120. The second actuator 124 includes a rack and pinion mechanism, a rack 134 or linear gear connected to the first end 130 of the second piston 122 engaging a pinion gear 136 attached to the driver 52 of the lockout mechanism 48 of the bicycle suspension 12. A spring 125 rotatably biases the driver 52 to bias the second piston 122 toward its first position.

The fluid path 84 includes the first and second fluid cavities 94, 128 and a flexible connector, in this embodiment a hydraulic hose 138, extending therebetween. One end 140 of the hydraulic hose 138 is connected to the fluid pump 80 through a first connector assembly 142 and the other end 144 of the hydraulic hose 138 is connected to the fluid responder 82 through a second connector assembly 146. The first connector assembly 142 includes a hose barb 148 having a first end 154 inserted into the end 140 of the hose 138 and a second end 156 connected to the first housing 86 of the fluid pump 80. The second connector assembly 146 includes a hose barb 158 and a threaded insert 162. One end 164 of the hose barb 158 is inserted into the end 144 of the hydraulic hose 138. The other end 166 of the hose barb 158 is threaded into the threaded insert 162 which is threaded into the second housing 120 of the fluid responder 82. A first O-ring 172 provides a seal between the hose barb 158 and the threaded insert 162. A second O-ring 174 provides a seal between the threaded insert 162 and the second housing 120. The fluid path 84 is discontiguous from the damping system 24 of the bicycle suspension 12.

To operate the bicycle suspension 12 between the first and second suspension settings, the push-button 106 is pushed to slidably displace the first piston 88 within the first fluid cavity 94 toward an open end 168 of the first fluid cavity 94 into its second position, causing the fluid to be displaced through the hydraulic hose 138 toward the fluid responder 82. The displaced fluid then slidably displaces the second piston 122 within the second fluid cavity 128 into its second position, causing the rack 134 to rotate the pinion gear 136, in turn, rotating the driver 52 of the damping system 24. Upon rotation of the driver 52, the valve 62 rotates to close the orifice 36 thereby locking the suspension 12, in this embodiment. To unlock the suspension 12, the push-button 106 is once again pushed to release the locking element 108, thereby permitting the biased driver 52 to bias the second piston 122 toward its first position, the displacement of the second piston 122 toward its first position displaces fluid through the hydraulic hose 138 to, in turn, displace the first piston 88 toward its first position.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A mounting device for mounting components to a bicycle handlebar having a handlebar axis, the mounting device comprising:
   a mounting bracket mountable to the handlebar about the handlebar axis, the mounting bracket including a first clamp portion and a second clamp portion hingedly connected to the first clamp portion to interiorly receive the handlebar,
   an interior channel defined by spaced sidewalls and a base portion and formed in a portion of the circumferential length of one of the first and second clamp portions, and
   a hole formed through the base portion and opening to the channel.

2. The mounting device of claim 1, wherein the hole is circular.

3. The mounting device of claim 1, wherein the hole is non-circular.

4. The mounting device of claim 3, wherein the hole is elongate and has a major diameter and a minor diameter, wherein the major diameter extends along the circumferential length.

5. The mounting device of claim 1, wherein the sidewalls matingly conform to a circumference of the handlebar.

6. The mounting device of claim 5, wherein an inner annular part of the sidewalls matingly conforming to the circumference of the handlebar define a first radius.

7. The mounting device of claim 6, wherein the base portion is formed at a second radius, the second radius being greater than the first radius.

8. The mounting device of claim 7, wherein the hole is elongate and has a major diameter and a minor diameter, wherein the major diameter extends along the circumferential length.

9. The mounting device of claim 8, wherein each of the first and second clamp portions include a hinged end and a distal end, the hinged ends forming the hinged connection, the distal ends drawable toward each other to mount the mounting device to the handlebar.

10. The mounting device of claim 1, wherein each of the first and second clamp portions include a hinged end and a distal end, the hinged ends forming the hinged connection, the distal ends drawable toward each other to mount the mounting device to the handlebar.

11. The mounting device of claim 10, wherein each distal end of the first and second clamp portions includes a convex feature.

* * * * *

US008162343C1

(12) INTER PARTES REEXAMINATION CERTIFICATE (953rd)

United States Patent
Weiss et al.

(10) Number: US 8,162,343 C1
(45) Certificate Issued: Sep. 2, 2014

(54) BICYCLE SUSPENSION SYSTEM

(75) Inventors: Martin Weiss, Schweinfurt (DE); Scott McLaughlin, Chicago, IL (US); Paul Feuerstein, Brookfield, IL (US); Matthew Morris, Chicago, IL (US)

(73) Assignee: SRAM, LLC, Chicago, IL (US)

Reexamination Request:
No. 95/001,978, Apr. 24, 2012

Reexamination Certificate for:
Patent No.: 8,162,343
Issued: Apr. 24, 2012
Appl. No.: 13/164,977
Filed: Jun. 21, 2011

Related U.S. Application Data (63) Continuation of application No. 12/205,318, filed on Sep. 5, 2008, now Pat. No. 7,988,173.

(51) Int. Cl.
*B62K 23/06* (2006.01)

(52) U.S. Cl.
USPC ................. 280/276; 248/229.13; 248/230.1; 248/230.4; 248/316.1; 248/316.5; 280/279; 280/280; 74/502.2

(58) Field of Classification Search
USPC .............. 280/276, 279, 280; 248/230.4, 229, 248/230.1, 316.1, 316.5; 74/502.2
See application file for complete search history.

(56) References Cited

To view the complete listing of prior art documents cited during the proceeding for Reexamination Control Number 95/001,978, please refer to the USPTO's public Patent Application Information Retrieval (PAIR) system under the Display References tab.

*Primary Examiner* — Matthew C. Graham (57) ABSTRACT

A mounting device is shown for mounting components to a bicycle handlebar having a handlebar axis. The mounting device includes a mounting bracket mountable to the handlebar about the handlebar axis. The mounting bracket includes a first clamp portion and a second clamp portion hingedly connected to the first clamp portion to interiorly receive the handlebar. An interior channel is defined by spaced sidewalls and formed in a portion of the circumferential length of one of the first and second clamp portions, and a hole is formed through the clamp portion and opens to the channel.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1 and 3-11 are cancelled.

Claim 2 was not reexamined.

\* \* \* \* \*